United States Patent
Cosentino et al.

(10) Patent No.: US 11,419,325 B2
(45) Date of Patent: Aug. 23, 2022

(54) RETENTION ASSEMBLIES FOR ANIMAL TRAPS

(71) Applicant: Plasticos Global Solutions, LLC, St. Louis, MO (US)

(72) Inventors: Michael Cosentino, St. Louis, MO (US); Douglas Hanneken, St. Louis, MO (US)

(73) Assignee: Plasticos Global Solutions, LLC, St. Louis, MO (US)

( * ) Notice: Subject to any disclaimer, the term of this patent is extended or adjusted under 35 U.S.C. 154(b) by 246 days.

(21) Appl. No.: 16/793,055

(22) Filed: Feb. 18, 2020

(65) Prior Publication Data

US 2021/0251210 A1    Aug. 19, 2021

(51) Int. Cl.
*A01M 23/24* (2006.01)
*A01M 23/30* (2006.01)

(52) U.S. Cl.
CPC .......... *A01M 23/245* (2013.01); *A01M 23/30* (2013.01)

(58) Field of Classification Search
CPC ..... A01M 23/245; A01M 23/30; A01M 23/24
See application file for complete search history.

(56) References Cited

U.S. PATENT DOCUMENTS

| | | | |
|---|---|---|---|
| 1,003,466 A * | 9/1911 | Kettelforder | A01M 23/24 43/85 |
| 1,345,137 A * | 6/1920 | Cowel | A01M 23/30 43/81 |
| 1,456,981 A * | 5/1923 | Goss | A01M 23/30 43/81 |
| 1,726,127 A * | 8/1929 | Seghers | A01M 23/30 43/81.5 |
| 3,394,488 A | 7/1968 | Kruger | |
| 4,161,080 A | 7/1979 | Gabry | |
| 4,363,183 A | 12/1982 | Drdlik | |
| 2018/0125056 A1 | 5/2018 | Hetman | |

FOREIGN PATENT DOCUMENTS

| | | | | |
|---|---|---|---|---|
| GB | 2587451 A * | 3/2021 | | A01M 23/30 |
| WO | 2017205768 A1 | 11/2017 | | |

OTHER PUBLICATIONS

"Align." Merriam-Webster.com Dictionary, Merriam-Webster, https://www.merriam-webster.com/dictionary/align Accessed Dec. 14, 2021 (Year: 2021).*

* cited by examiner

*Primary Examiner* — Kathleen I Alker
*Assistant Examiner* — Carly W. Lynch
(74) *Attorney, Agent, or Firm* — Armstrong Teasdale LLP (57) ABSTRACT

Disclosed herein is a retaining assembly for an animal trap. The retaining assembly includes a housing configured to be mounted to a base of the animal trap. A drawer is slidably coupled to the housing between a first position and a second position. A retaining feature is coupled to the drawer. The retaining feature is configured to engage with a retaining arm of the animal trap in the first position and disengage from the retaining arm in the second position.

20 Claims, 10 Drawing Sheets

RETENTION ASSEMBLIES FOR ANIMAL TRAPS

FIELD OF THE DISCLOSURE

The present disclosure relates to a retention assembly, and more particularly, to a retention assembly including a bait drawer that may be moved from a covered position to disengage a retaining arm and release a strike bar.

BACKGROUND

At least some known animal traps include a spring loaded strike bar that is held in an armed position by a retaining arm. In this armed position, the retaining arm may be engaged with a bait holder. When an animal attempts to retrieve bait from the bait holder, the animal may move the bait holder causing the retaining arm to become disengaged releasing the strike bar from the armed position. The tension stored in the loaded spring forces the strike bar from the armed position to an impact position. In the impact position, the strike bar is intended to strike the animal near the bait holder using the force stored in the spring.

In some known cases, the animal may be able to retrieve the bait from the bait holder without disengaging the retaining arm, i.e., without triggering the trap. For example, the animal may retrieve the bait without significantly moving the bait holder, such that the retaining arm does not become disengaged with the bait tray and the retaining arm continues to hold the strike bar in the armed position. At least some known animal traps provide mechanisms or features that partially cover the bait or the bait holder. These mechanisms or features may help to guide the animal toward the bait holder or make it more challenging for the animal to remove the bait without moving the bait holder. In some known cases, the animal may still have access to the bait to retrieve at least a portion of the bait without triggering the trap.

Additionally, a person may find it difficult to bait and set the trap without triggering the animal trap accidentally. For example, the person may place bait onto the bait holder and then the person must arrange the strike bar in the armed position and engage the retaining arm with the bait tray to hold the strike bar in the loaded position, without dislodging the bait from the bait holder. In other examples, a person may bait the animal trap after the strike bar is held in the armed position by the retaining arm. A person may find it difficult to place the bait on the bait holder without triggering the trap. Further, in some known cases, the person may trigger the trap while placing the trap in locations in and around the home.

Accordingly, it may be advantageous to prevent access to the bait in order to prevent the animal from retrieving the bait without triggering the animal trap and provide features that allow a person to easily bait and set the animal trap without triggering the animal trap.

SUMMARY

One aspect of the present disclosure is directed a retention assembly for an animal trap including a base. The retention assembly includes a housing configured to be mounted to the base and a drawer slidably coupled to the housing between a first position and a second position. The drawer includes a a retaining feature configured to engage a retaining arm of the animal trap in the first position, and configured to be disengaged from the retaining arm in the second position.

Another aspect of the present disclosure is directed an animal trap including a base, a strike bar, and a retaining arm configured to hold the strike bar in an armed position. The animal trap further includes a housing mounted to the base and a drawer slidably coupled to the housing between a first position and a second position. The drawer includes a retaining feature configured to engage the retaining arm in the first position to maintain the strike bar in the armed position, and configured to be disengaged from the retaining arm in the second position to enable the strike bar to move to a released position.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

FIGS. 1-10 illustrate example embodiments of a retention assembly 100 and retention assembly 300 for use with an animal trap 200 according to the present disclosure. The retention assembly 100 and retention assembly 300 may be used with the animal trap 200 to lure an animal to the animal trap 200 using bait and to catch and/or exterminate an animal that attempts to retrieve the bait from the retention assembly 100 or 300. The retention assembly 100 and 300 may be mounted to the animal trap 200. In some other example embodiments, the retention assembly 100 or 300 is formed integrally with the animal trap 200.

The animal trap 200 includes a base 202, a strike bar 204, a retaining arm 206, and one or more of a torsion spring 208. The base 202 includes a first base end 210 and a second base end 212. The strike bar 204 includes a top bar 214, a lower bar 216, and a first side bar 218, and a second side bar 220. The top bar 214 and the lower bar 216 are arranged approximately perpendicularly to the first and second side bars 218, 220. In some example embodiments, the strike bar 204 may be formed from a single length of wire. The strike bar 204 is rotationally coupled to the base 202 enabling at least a portion of the strike bar 204 to be arranged relative to the base 202.

More specifically, the strike bar 204 is rotationally coupled to the base 202 at the lower bar 216 to enable the top bar 214 to be positioned at either the first base end 210 or the second base end 212. The strike bar 204 includes a rotational axis $A_{204}$ extending along the lower bar 216. The lower bar 216 is rotationally mounted to the base 202 at a location between the first base end 210 and the second base end 212. The lower bar 216 may be rotationally mounted to the base 202 by one or more of a connectors 230, for example and without limitation, connectors 230 may include a staple, eye plate staple, and/or a hook. In other words, the strike bar 204 may rotate at the lower bar 216 about the rotational axis $A_{204}$, such that the top bar 214 may be positioned at either the first base end 210 or the second base end 212. In alternative embodiments, the strike bar 204 may be any configuration that enables the animal trap 200 and retention assembly 100 to function as described herein.

The one or more torsion springs 208 are coupled to both the strike bar 204 and the base 202. When the strike bar 204 rotates about the base 202, the tension in the torsion spring 208 may increase or decrease. The strike bar 204 may be arranged in either an armed position 232 (shown in FIG. 1) or in an impact position 234 (shown in FIG. 2). In the armed position 232, the strike bar 204 is rotated about the lower bar 216 such that the top bar 214 is arranged in proximity to the first base end 210. In this armed position 232, the position of the strike bar 204 generates a tension in the torsion spring 208. In the impact position 234, the strike bar 204 is arranged in proximity to the second base end 212, and the tension stored in the torsion spring 208 when the strike bar was arranged in the armed position 232 is released.

The torsion spring 208 may be coupled to at least one of the first side bar 218 and/or the second side bar 220 of the strike bar 204. When the strike bar 204 is moved to the armed position 232, at least one of the first and/or second side bars 218, 220 applies a torque to the torsion spring 208. The torque increases the tension stored in the torsion spring 208.

Likewise, when the strike bar 204 is moved from the armed position 232 to the impact position 234, at least one of the first and/or the second side bars 218, 220 decreases the torque applied to torsion spring 208. The tension stored in the torsion spring 208 is released and the torsion spring 208 applies a torque to the strike bar 204 moving it from the armed position 232 to the impact position 234.

In other words, rotating the strike bar 204 to the armed position 232 generates a spring force stored torsion spring 208. The spring force stored in the torsion spring 208 may rotate the strike bar 204 from the armed position 232 to the strike position. A user may grip the strike bar 204 and push against the spring force to place the strike bar 204 in the armed position 232. Upon release of the strike bar 204, the tension stored in the torsion spring 208 causes the strike bar 204 to rotate about the base 202 to position the top bar 214 in impact position 234.

The retaining arm 206 is used to retain the strike bar 204 in the armed position 232. The retaining arm 206 includes a retaining arm first end 240 and a retaining arm second end 242. The first end 240 is rotationally coupled to the base 202 near the first base end 210. The second end 242 is free to move relative to the base 202. The retaining arm 206 may be rotated about the first end 240 to allow the second end 242 to be positionable relative to the base 202. The first end 240 may be rotationally coupled to the base 202 using a connector, for example and without limitation the connector may be a hook.

The retaining arm 206 may be rotated to extend over the strike bar 204 in the armed position 232 to enable the retaining arm 206 to retain the strike bar 204 in the armed position 232. The retaining arm 206 experiences an upward force from the strike bar 204 caused by the tension stored in the torsion spring 208. The retaining arm 206 may be held by the retention assembly 100 to enable the retaining arm 206 to resist the upward force in order to hold the strike bar 204 in the armed position 232.

In the example embodiment illustrated in FIG. 1-5, retention assembly 100 is provided. The retention assembly 100 may be coupled to animal trap 200. The retention assembly 100 includes housing 102 and a drawer 104. The housing 102 includes a housing rear wall 106, a housing front wall 108, and a roof 110 that extends over the housing rear wall 106 and the housing front wall 108. In some example embodiments, the housing 102 of the retention assembly 100 is mounted to the base 202, such that the housing rear wall 106 and housing front wall 108 extends upward perpendicularly from the base 202. For example the housing 102 may be screwed to the base 202. The housing 102 further includes a first side wall 112 and a second side wall 114 extending between the housing rear wall 106 and the housing front wall 108. The drawer 104 is slidably coupled to the housing 102 and the base 202 to enable the drawer 104 to translate relative to the housing 102 and the base 202.

The housing 102 has a housing chamber 116 (shown in FIGS. 5 and 6) that is defined by the housing rear wall 106, the housing front wall 108, the first and second side walls 112, 114, and the roof 110. The housing chamber 116 is sized and shaped to receive at least a portion of the drawer 104 therein. The housing front wall 108 includes an opening 109 that is sized and shaped such that the drawer 104 may pass through the opening 109 and into the housing chamber 116.

The drawer 104 includes a drawer rear wall 120, a drawer front wall 122, and a bait chamber 124 formed thereon. The bait chamber 124 (shown in FIG. 2) is sized and shaped such that bait may be placed within the bait chamber 124. The bait chamber 124 may include features that help retain the bait. For example, the bait chamber 124 may include protrusions that engage the bait to ensure that the bait does not become dislodged from the bait chamber 124.

Figure 1:
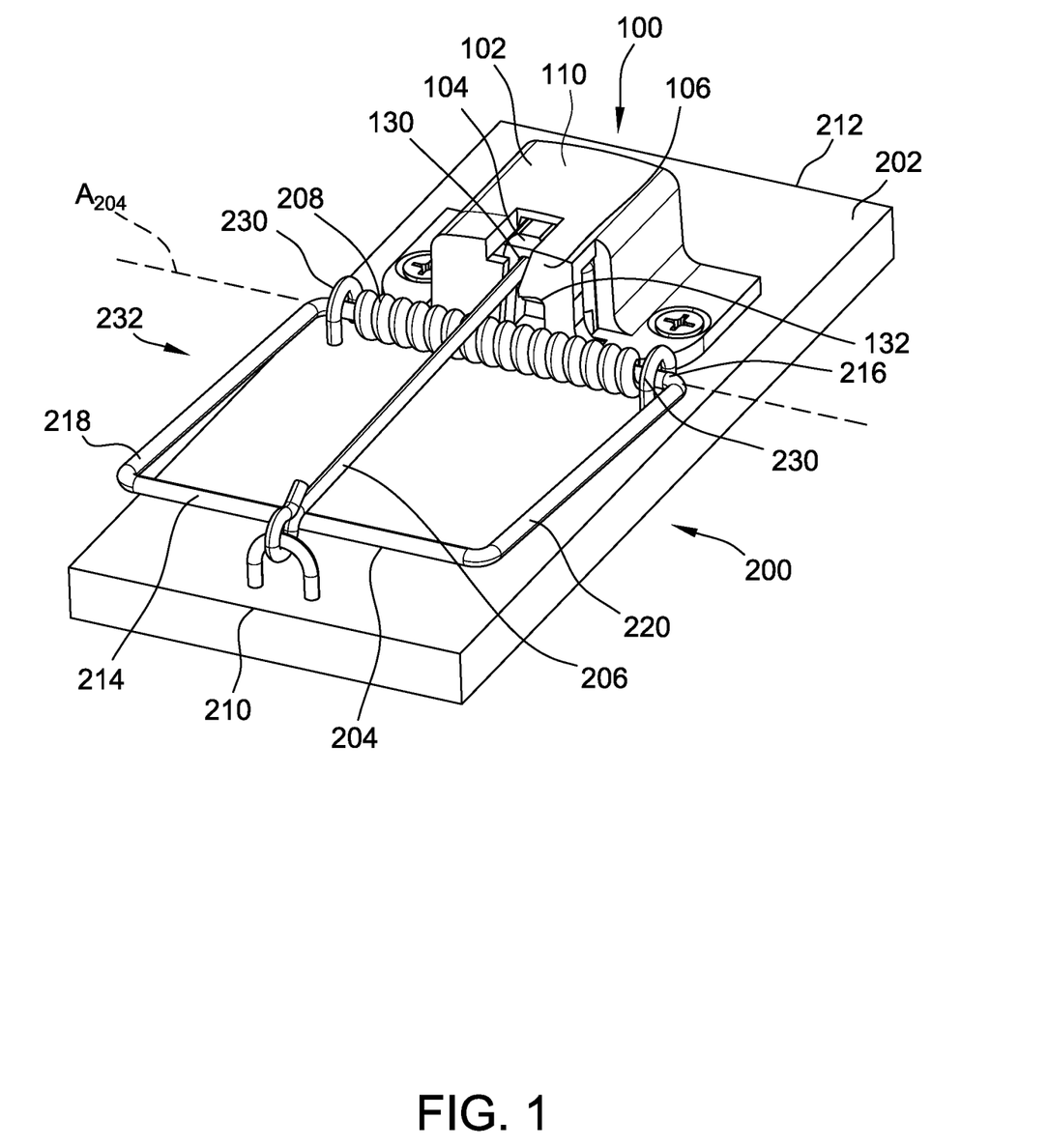
FIG. 1 is a front perspective view of an example retention assembly mounted to an animal trap, in a set position with a strike bar in the armed position and a drawer in the first position.
Figure 2:
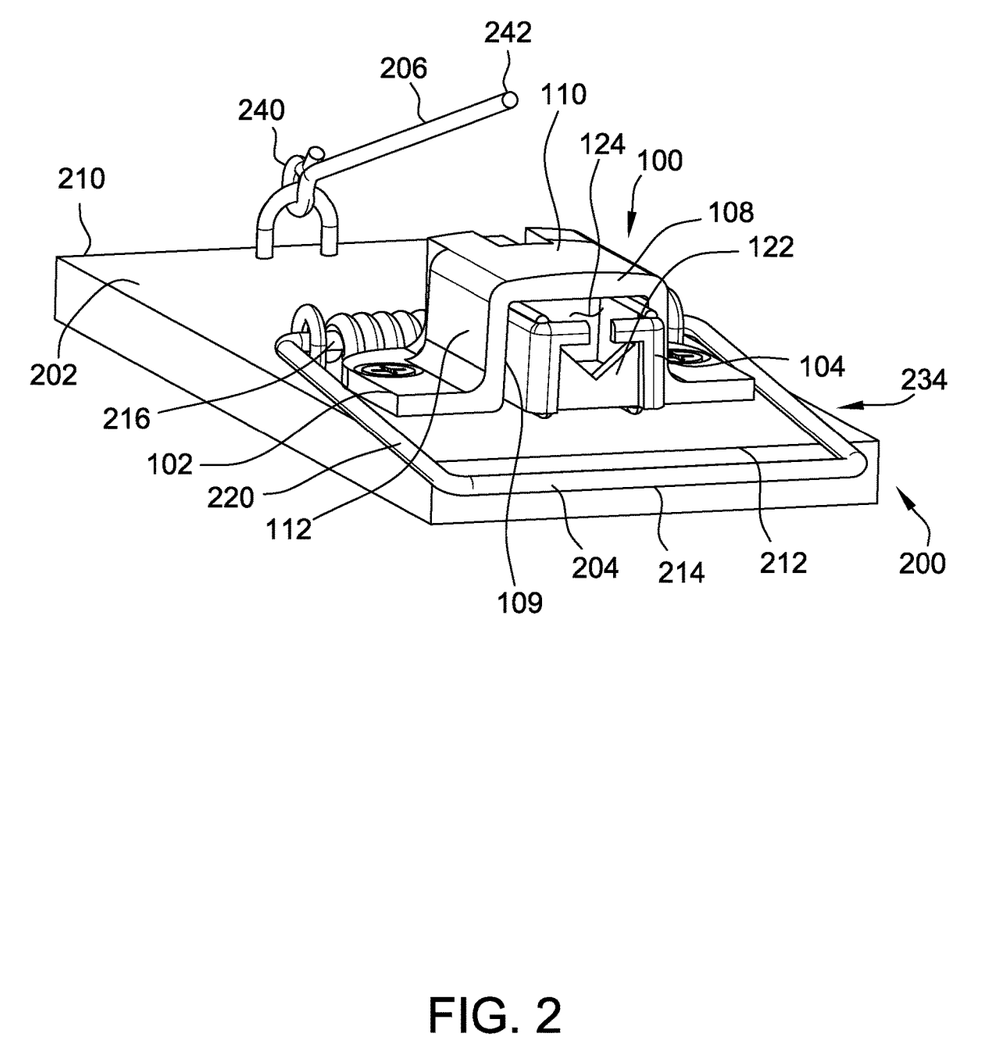
FIG. 2 is a rear perspective of the retention assembly mounted to the animal trap as shown FIG. 1, in the triggered position and the strike bar in the impact position and the drawer in the second position.

The drawer 104 is slidably coupled to the housing 102 to enable the drawer 104 to move through the opening 109 and into the housing chamber 116 or move through the opening 109 and out of the housing chamber 116. More specifically, the drawer rear wall 120 may be translated toward the housing rear wall 106 or translated away from the housing rear wall 106. The drawer 104 may be translated relative to the housing 102 such that the drawer 104 may be arranged relative to the housing 102 in at least one of the first position (FIG. 1) or a second position (FIG. 2).

In the first position, the drawer rear wall 120 is arranged in proximity to the housing rear wall 106. In the first position, the drawer 104 may be at least partially contained within the housing chamber 116, and the bait chamber 124 may be completely covered by the housing 102. More specifically, in the first position, the bait chamber 124 may be completely covered by the roof 110 of the housing 102, such that bait contained within the bait chamber 124 may not be accessible to an animal for retrieval.

In the second position, the drawer 104 is arranged such that the drawer rear wall 120 is positioned a distance away from the housing rear wall 106. In some example embodiments, in the second position, the drawer 104 may partially extend out of the opening 109 of the housing 102. The drawer 104 may be at least partially exposed from the housing chamber 116, such that at least a portion of the drawer 104 or a portion of the bait chamber 124 is exposed from the housing 102.

In other words, when the drawer 104 is arranged in the first position, bait contained in the bait chamber 124 cannot be accessed by an animal. As such, an animal may be encouraged to move or pull the drawer 104 such that the drawer 104 is translated out of the housing chamber 116 in an attempt to access the bait.

The drawer 104 may be translated between the first position and the second position. Specifically, the drawer 104 may be pushed from the second position to the first positon, moving the drawer 104 into the housing chamber 116 such that the rear wall 120 moves closer to the housing rear wall 106 and covering bait chamber by the housing 102. Likewise, the drawer 104 may be pulled from the first position to the second position, moving the drawer 104 at least partially out of the housing chamber 116 such that the rear wall 120 away from the housing rear wall 106 and at least partially uncovering the drawer 104 from the housing 102. In some example embodiments, the bait chamber 124 may be covered by the housing 102 when the bait chamber 124 is in either the first position or the second position.

The drawer front wall 122 may include openings that allow the smell of the bait to emanate from within the bait chamber 124. Additionally or alternatively, the drawer front wall 122 may include features that may be used to grip and pull and/or push the drawer between the first and second positions. The housing rear wall 106 includes a second opening 126, such that when the drawer 104 is arranged in the first position, the drawer rear wall 120 is arranged in proximity to the second opening 126.

The drawer rear wall 120 includes a retaining feature 130 formed thereon. The retaining feature 130 is sized and shaped to receive at least a portion of the second end 242 of the retaining arm 206. The retaining feature 130 engages with the retaining arm 206 to secure the retaining arm 206 while the retaining arm 206 is retaining the strike bar 204 in the armed position 232. When the retaining arm 206 is engaged with the holding feature 132, while the retaining arm 206 is retaining the strike bar 204, the animal trap 200 and the retention assembly 100 are in a set position (FIG. 1). In the set position, the drawer 104 may be arranged in the first position. The retaining feature 130 includes a retaining curved surface 140. The retaining curved surface 140 may be sized and shaped to enable the retaining arm 206 to engage with the retaining curved surface 140.

In the set position, the retaining arm 206 may extend through the second opening 126 and into the retaining feature 130 on the drawer rear wall 120. Alternatively or additionally, the retaining feature 130 may extend out of the housing 102 through the second opening 126. In other words, in the set position, the drawer 104 is in the first position and the retaining arm 206 may reach to engage with the retaining feature 130 on the drawer rear wall 120.

When the drawer 104 is moved from the first position to the second positon, the drawer rear wall 120 is moved to disengage the retaining arm 206 from the retaining feature 130. In other words, when the drawer 104 is in the second position, the retaining arm 206 will not reach the retaining feature 130 on the drawer rear wall 120. When the drawer 104 is moved from the first position to the second position, the retention arm 206 becomes disengaged with the retaining feature 130, the strike bar 204 is released, and the force stored in the torsion spring 208 moves the strike bar 204 from the armed position 232 to the impact position 234.

Figure 3:
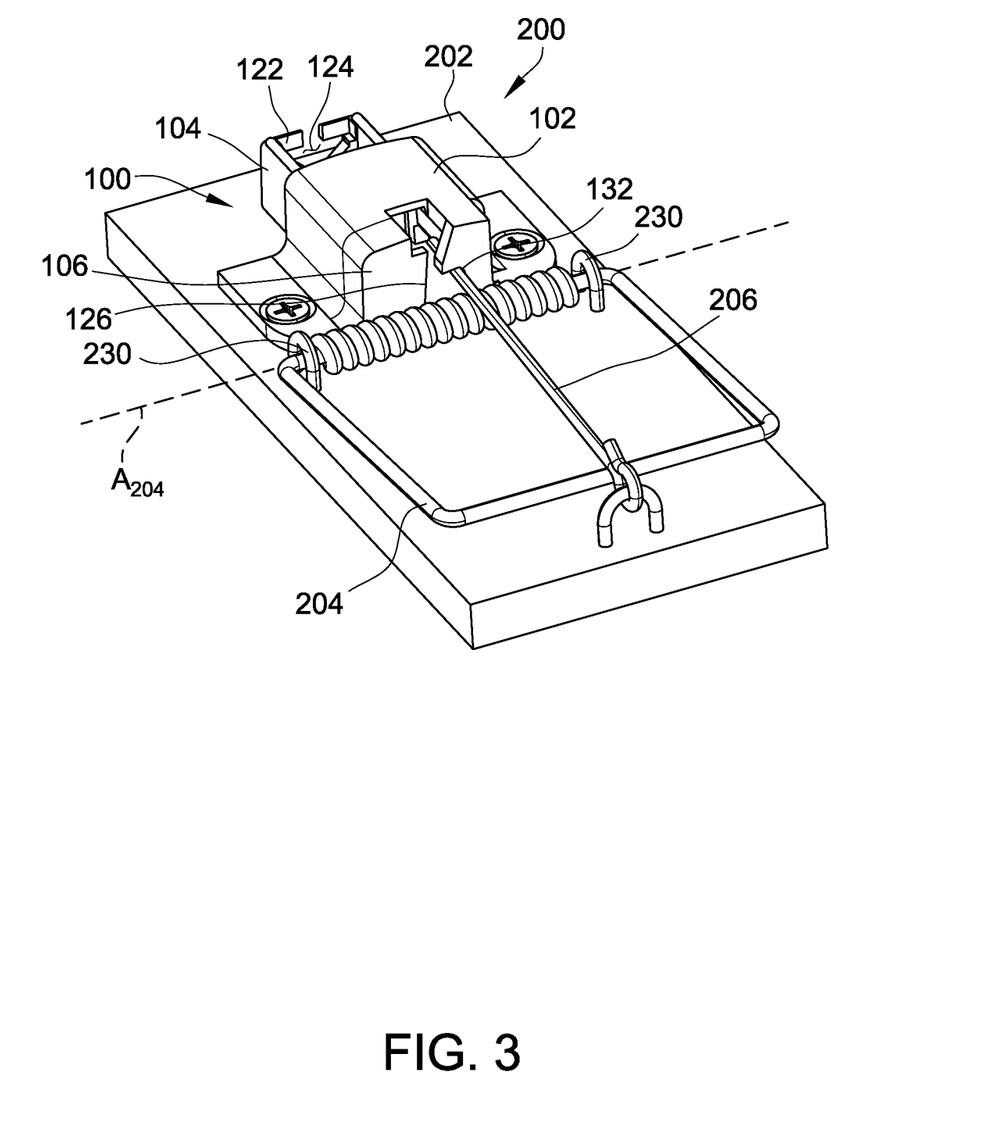
FIG. 3 is a front perspective of the retention assembly mounted to an animal trap as shown FIG. 1 in a preset position with the strike bar in the armed position and the drawer in the second position.
Figure 4:
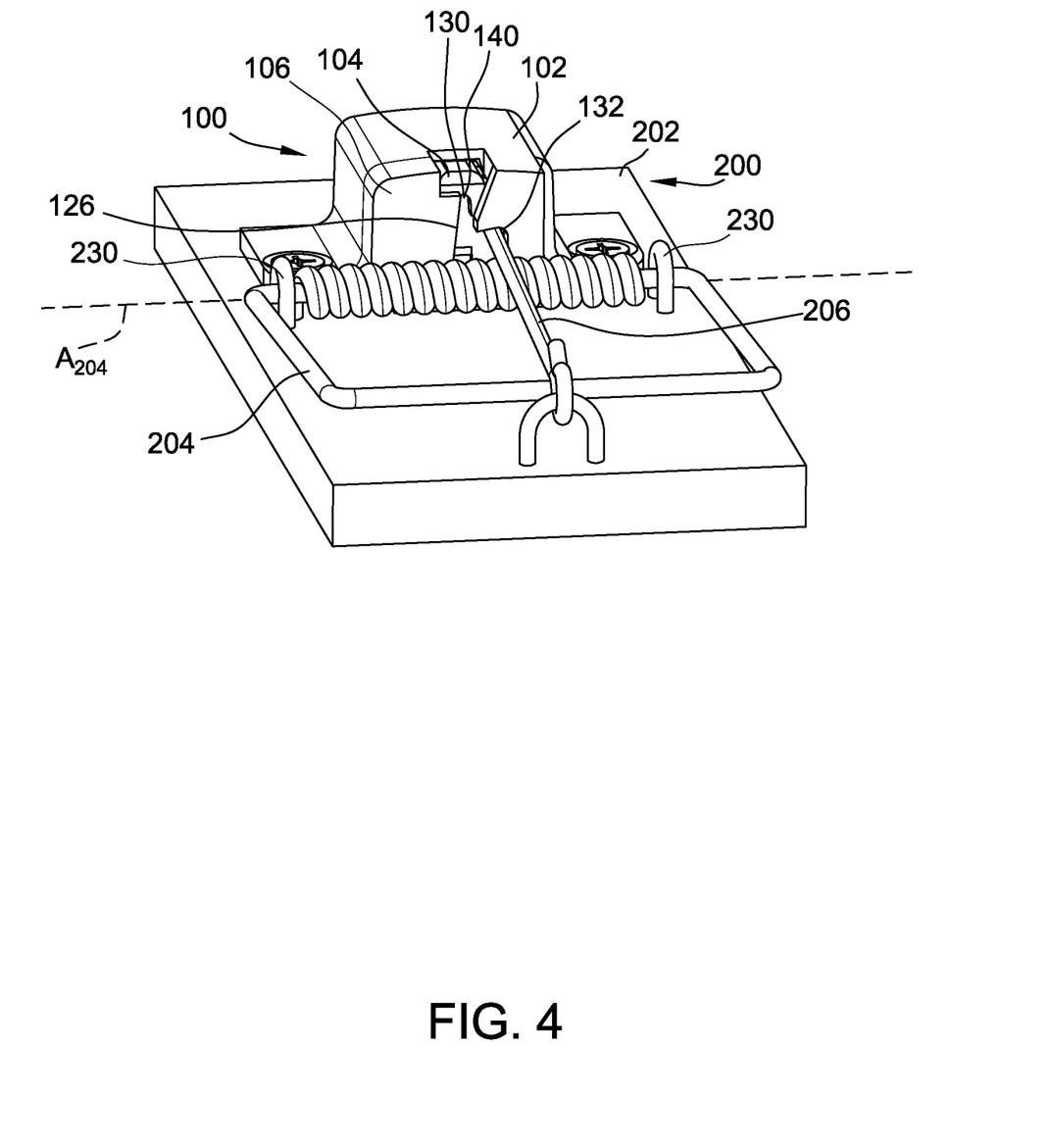
FIG. 4 is a front perspective of the retention assembly mounted to an animal trap shown FIG. 1 in the preset position with the strike bar in the armed position and the drawer in the first position.
Figure 5:
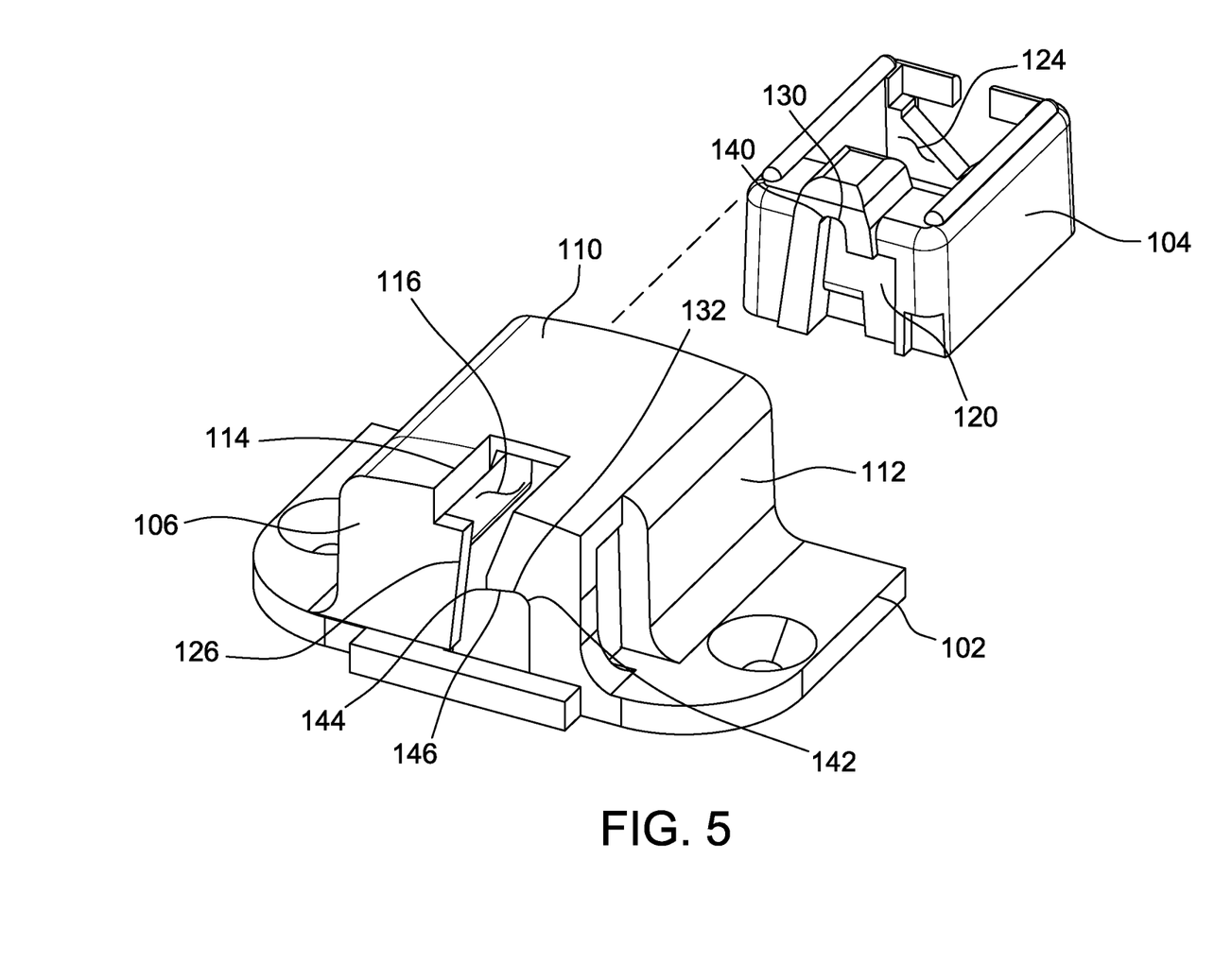
FIG. 5 is an assembly view of the retention assembly shown in FIG. 1, with the drawer removed from the housing.
Figure 6:
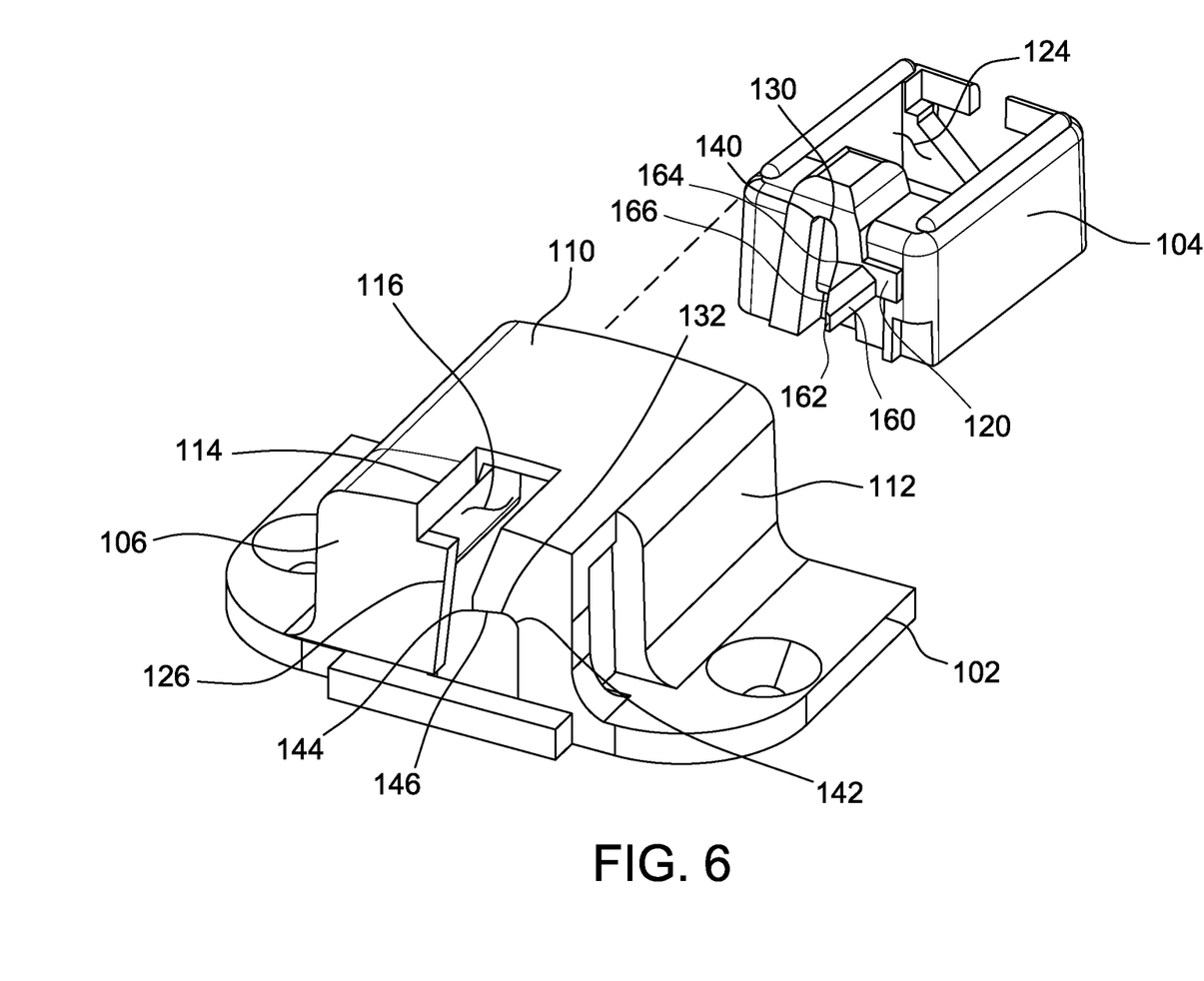
FIG. 6 is an assembly view of the retention assembly shown in FIG. 1, with the drawer removed from the housing and a wedge feature.

The housing rear wall 106 includes a holding feature 132. The holding feature 132 includes a holding curved surface 142 that is sized and shaped to engage with the retaining arm 206. When the retaining arm 206 is engaged with the holding feature 132 and the strike bar is in the armed position 232, the animal trap 200 and the retention assembly 100 are arranged in a preset position (FIGS. 3 and 4). In the preset position, the drawer 104 may be arranged in at least one of the first position (FIG. 4) or the second position (FIG. 3). The preset position, allows the drawer 104 to be moved in and out of the housing 102 without disengaging the retaining arm 206. This allows the bait chamber 124 to be filled while maintaining the strike bar 204 in the armed position 232.

Further, the retaining arm 206 may be engaged with the holding feature 132 regardless of the position of the drawer 104, i.e., the drawer 104 may be arranged in either the first position or the second position. Additionally or alternatively, the drawer 104 may be removed from the housing 102 completely such that bait may be placed within the bait chamber 124.

When the drawer 104 is in the first positon, the retaining arm 206 may be moved from the holding feature 132 to the retaining feature 130 while the retaining arm 206 retains the strike bar 204 in the armed position 232. In other words, the animal trap 200 may be transitioned from a preset position to a set position, while the strike bar 204 is maintained in the armed position 232. When the drawer 104 is arranged in the first position, the retaining feature 130 and the holding feature 132 may be in proximity to each other. Further, in the first position, the holding feature 132 may be aligned with the retaining feature 130. More specifically, the holding feature 132 and the retaining feature 130 are arranged in proximity to each other such that the retaining arm 206 may be moved from the holding feature 132 and into the retaining feature 130 while maintaining the armed position 232 of the strike bar 204. The drawer 104 and the housing 102 may include additional features or mechanisms that enable the retaining arm 206 to be moved between the holding feature 132 and the retaining feature 130 while retaining the strike bar 204 in the armed position 232.

While the retaining arm 206 is retaining the strike bar 204 in the armed position 232, the retaining arm 206 experiences an upward force created by the tension stored in the torsion spring 208. This upward force, i.e., up from the base 202, flexes the retaining arm 206 in an upward direction. The flexion of the retaining arm 206 aids the retaining arm 206 to engage with the holding feature 130 or the retaining feature 130. More specifically, the upward force on the retaining arm 206 presses the retaining arm 206 into engagement with the holding curved surface 142 or the curved retaining surface 140.

In the embodiments illustrated in FIG. 1-6, the holding feature 132 further includes a first edge 144 and a linear surface 146. The linear surface 146 extends between the first edge 144 and the holding curved surface 142. The first edge 144 may be below, i.e., closer to the base 202, than the holding curved surface 142 and the retaining curved surface 140.

The retaining arm 206 may be moved downward from the holding curved surface 142, along the linear surface 146, and past the first edge 144. The retaining arm 206 may be guided by the linear surface 146 and the first edge 144. After the retaining arm 206 passes the first edge 144, the retaining arm 206 may flex upward into the retaining feature 130, and more specifically, the retaining curved surface 140.

In some example embodiments, the retention assembly 100 may include additional or alternative features that enable the retaining arm 206 to disengage the holding feature 132 and then engage the retaining feature 130 as the drawer 104 is moved from the second position to the first position. In embodiments illustrated in FIG. 6, the drawer 104 may include a wedge feature 160 disposed on the rear surface 120. The wedge feature 160 has a first end 162 and a second end 164 and an inclined surface 166 extending therebetween. The first end 162 extends outward from the drawer rear surface 120 towards the housing rear wall 106. In some cases, at least a portion of the wedge feature 160 may extend through the opening 126. When the drawer 102 is in the first position, the wedge feature 160 is arranged adjacent to the holding feature 132.

As the drawer 102 is moved from the second position to the first position, the first end 162 is arranged into proximity with the holding feature 132 on the housing rear wall 106. When the retaining arm 206 is engaged with the holding feature 132, i.e., in the preset position, and the drawer 102 is moved from the second position to the first position, the first end 162 may become engaged with the retaining arm 206, causing the retaining arm 206 to be disengaged with the holding feature 132. As the drawer 102 is moved further towards the first position from the second position, the retaining arm 206 is in sliding engagement with the inclined surface 166. The second end 164 is adjacent to the retaining feature 130 enabling the retaining arm 206 to travel along the inclined surface 166 and past the second end 164 and into engagement with the retaining feature 130. In other words, as the drawer 102 is moved from the second position to the first position, the wedge feature 160 disengages the retaining arm 206 from the holding feature 132 and guides the retaining arm 206 into engagement with the retaining feature 130.

In the example embodiment illustrated in FIG. 7-10, the retention assembly 300 is provided. Retention assembly 300 may be coupled to animal trap 200. Retention assembly 300 includes housing 302 and a drawer 304. The housing 302 includes a housing rear wall 306, a housing front wall 308, and a roof 310 that extends over the housing rear wall 306 and the housing front wall 308. In some example embodiments, the housing 302 of the retention assembly 300 may be mounted to the base 202, such that the housing rear wall 306 and housing front wall 308 extends upward perpendicularly from the base 202. For example the housing 302 may be screwed to the base 202. The housing 302 further includes a first side wall 312 and a second side wall 314 extending between the housing rear wall 106 and the housing front wall 308. The drawer 304 is slidably coupled to the housing 302 and the base 202 to enable the drawer 304 to translate relative to the housing 302 and the base 202.

The housing 302 has housing chamber 316 that is defined by the housing rear wall 306, the housing front wall 308, the first and second side walls 312, 314 and the roof 310. The housing chamber 316 is sized and shaped to receive at least a portion of the drawer 304 therein. The housing front wall 308 includes an opening 309 that is sized and shaped such that the drawer 304 may pass through the opening 309 and into the housing chamber 316.

The drawer 304 includes a drawer rear wall 320, a drawer front wall 322, and a bait chamber 324 formed thereon. The bait chamber 324 is sized and shaped such that bait may be placed within the bait chamber 324. The bait chamber 324 may include features that help retain the bait. For example, the bait chamber 324 may include protrusions that engage the bait to ensure that the bait does not become dislodged.

Figure 7:
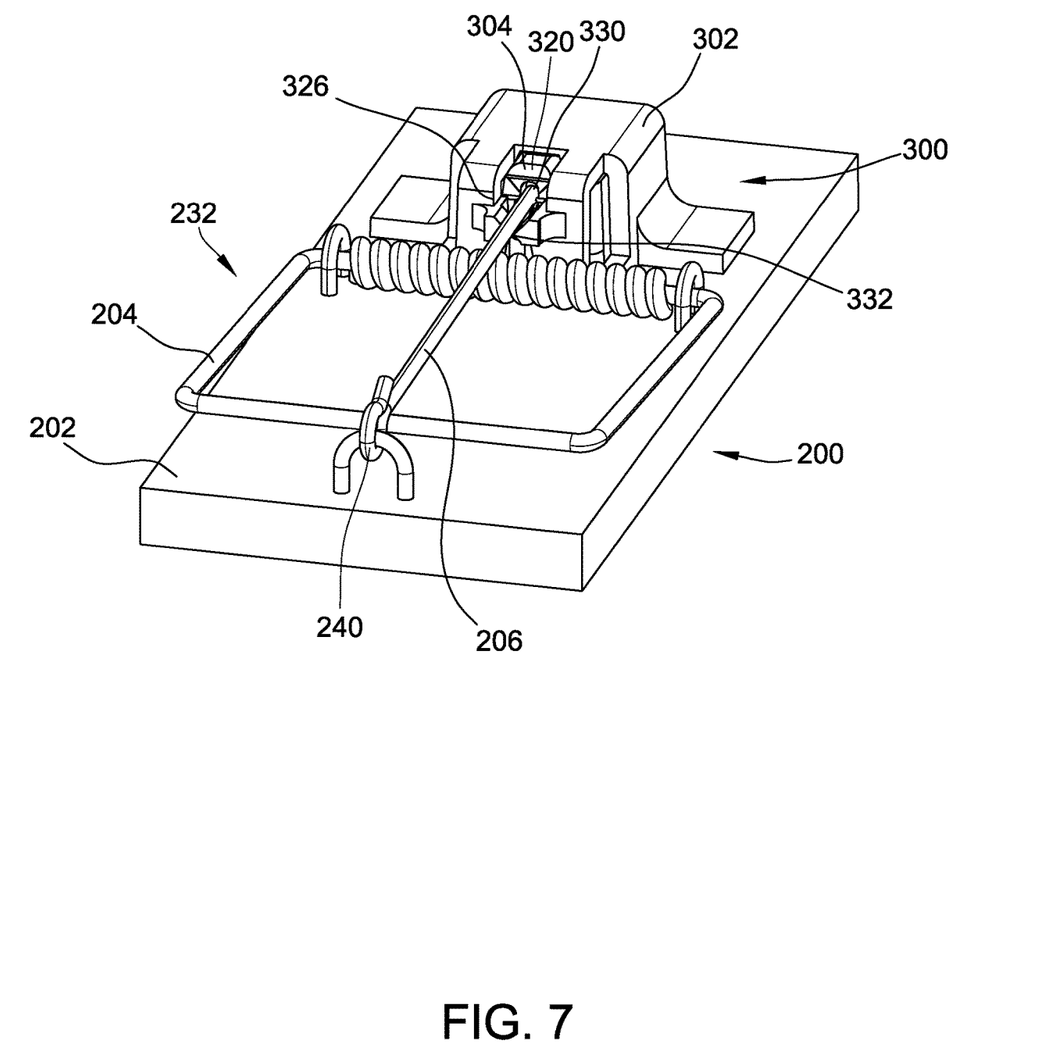
FIG. 7 is a perspective view of an example embodiment of a retention assembly mounted to an animal trap, in an set position with the strike bar in the armed position and the drawer in the first position.
Figure 8:
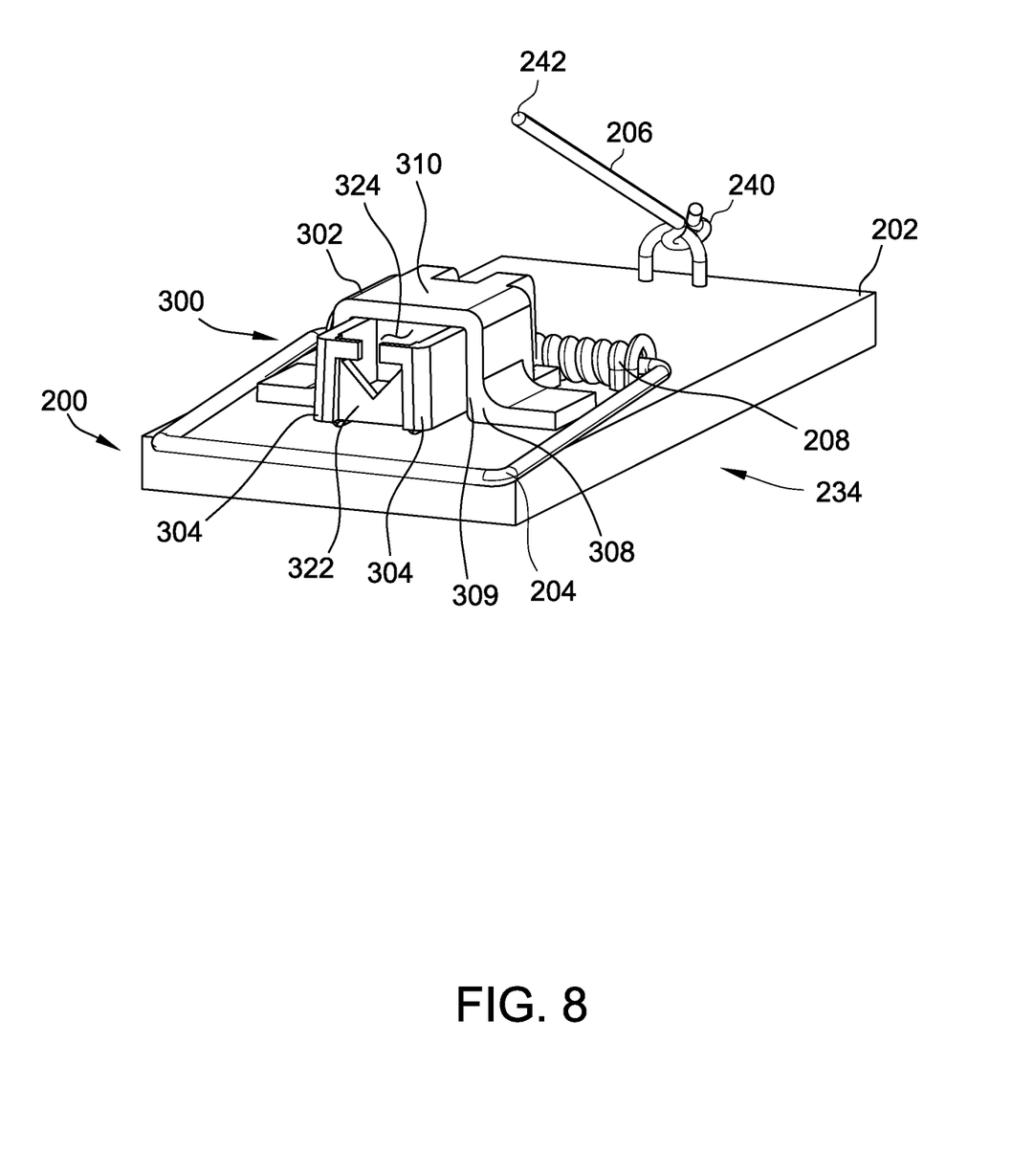
FIG. 8 is a rear perspective view of the retention assembly mounted to an animal trap as shown in FIG. 6, in a triggered position and the strike bar in an impact position and the drawer in the second position.

The drawer 304 is slidably coupled to the housing 302 to enable the drawer 304 to move through the opening 309 and into the housing chamber 316 or move through the opening 309 and out of the housing chamber 316. More specifically, the drawer rear wall 320 may be translated toward the housing rear wall 306 or translated away from the housing rear wall 306. The drawer 304 may be translated relative to the housing 302 such that the drawer 304 may be arranged relative to the housing 302 in at least one of the first position (FIG. 7) or a second position (FIG. 8).

In the first position, the drawer rear wall 320 is arranged in proximity to the housing rear wall 306. In the first position, the drawer 304 may be at least partially contained within the housing chamber 316, and the bait chamber 324 may be completely covered by the housing 302. More specifically, in the first position, the bait chamber 124 may be completely covered by the roof 110 of the housing 102, such that bait contained within the bait chamber 124 may not be accessible to an animal for retrieval.

In the second position, the drawer 304 is arranged such that the drawer rear wall 320 is positioned a distance away from the housing rear wall 306. In some example embodiments, in the second position, the drawer 304 may partially extend out of the opening 109 of the housing 302. The drawer 304 may be at least partially exposed from the housing chamber 316, such that at least a portion of the drawer 304 or a portion of the bait chamber 324 is exposed from the housing 302.

In other words, when the drawer 104 is arranged in the first position, bait contained in the bait chamber 124 cannot be accessed by an animal. As such, an animal may be encouraged to move or pull the drawer 104 such that the drawer 104 is translated out of the housing chamber 116 in an attempt to access the bait.

The drawer 304 may be translated between the first position and the second position. Specifically, the drawer 304 may be pushed from the second position to the first positon, moving the drawer 304 further into the housing chamber 316 such that the rear wall 320 moves closer to the housing rear wall 306 and covering bait chamber by the housing 302. Likewise, the drawer 304 may be pulled from the first position to the second position, moving the drawer 304 at least partially out of the housing chamber 316 such that the rear wall 320 away from the housing rear wall 306 and at least partially uncovering the drawer 304 from the housing 302. In some example embodiments, the bait chamber 324 may be covered by the housing 302 when the bait chamber 324 is in either the first position or the second position.

The drawer front wall 322 may include openings that allow the smell of the bait to emanate from within the bait chamber 324. Additionally or alternatively, the drawer front wall 322 may include features that may be used to grip and pull and/or push the drawer between the first and second positions. In addition, the housing rear wall 306 includes a second opening 326, such that when the drawer 304 is arranged in the first position, the drawer rear wall 320 is arranged in proximity to the second opening 326.

The drawer rear wall 320 includes a retaining feature 330 formed thereon. The retaining feature 330 is sized and shaped to receive at least a portion of the second end 242 of the retaining arm 206. The retaining feature 330 engages with the retaining arm 206 to secure the retaining arm 206 while the retaining arm 206 is retaining the strike bar 204 in the armed position 232. When the retaining arm 206 is engaged with the holding feature 332, while the retaining arm 206 is retaining the strike bar 204, the animal trap 200 and the retention assembly 300 are in a set position (FIG. 7). In the set position, the drawer 304 may be arranged in the first position. The retaining feature 330 includes a retaining curved surface 340. The retaining curved surface 340 may be sized and shaped to enable the retaining arm 206 to engage with the retaining curved surface 340.

In the set position, the retaining arm 206 may extend through the second opening 326 and into the retaining feature 330 on the drawer rear wall 320. Alternatively or additionally, the retaining feature 330 may extend out of the housing 302 through the second opening 326. In other words, in the set position, the drawer 304 is in the first position and the retaining arm 206 may reach to engage with the retaining feature 330 on the drawer rear wall 320.

When the drawer 304 is moved from the first position to the second positon, the drawer rear wall 320 is moved to disengage the retaining arm 206 from the retaining feature 330. In other words, when the drawer 304 is in the second position, the retaining arm 206 will not reach the retaining feature 330 on the drawer rear wall 320. When the drawer 304 is moved from the first position to the second position, the retention arm 206 becomes disengaged with the retaining feature 330, the strike bar 204 is released, and the force stored in the torsion spring 208 moves the strike bar 204 from the armed position 232 to the impact position 234.

Figure 9:
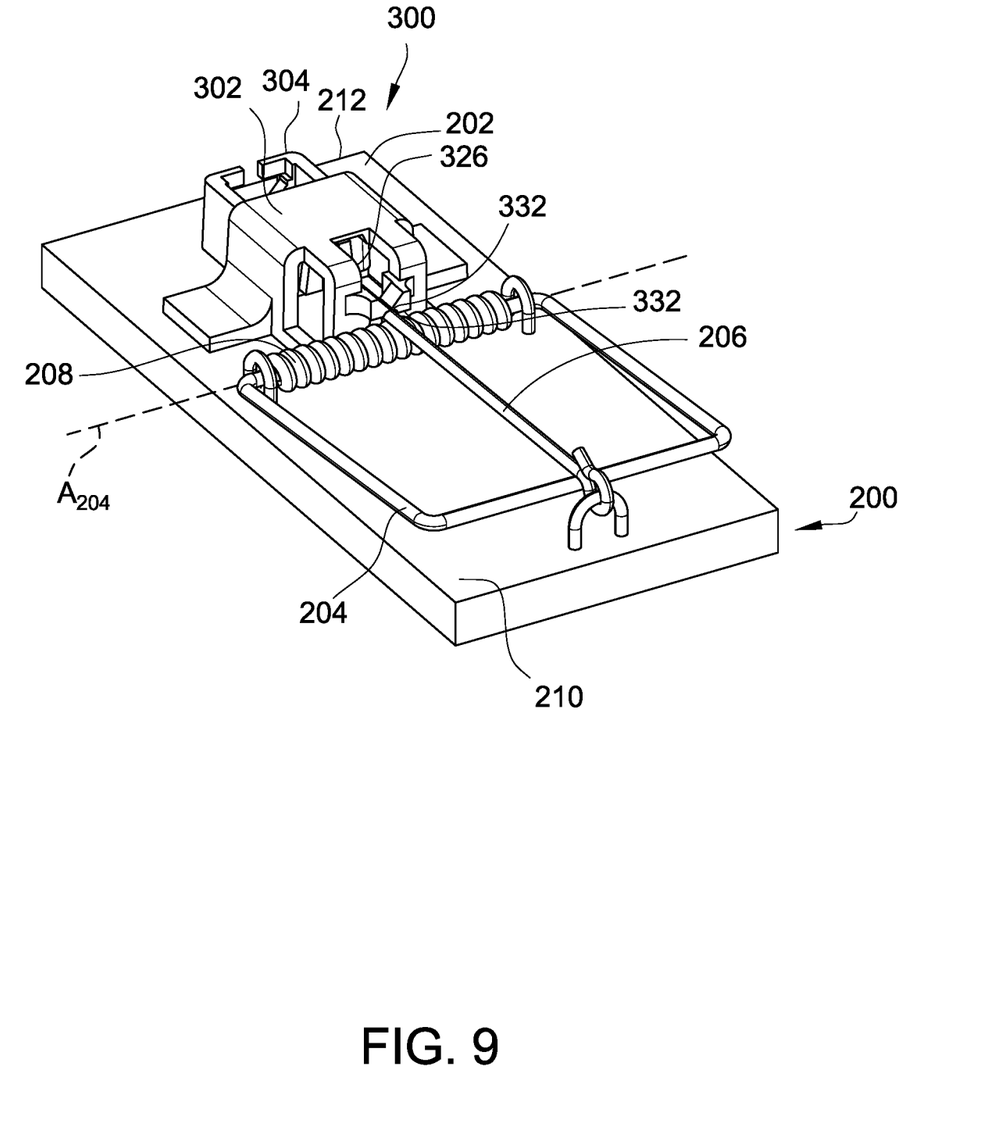
FIG. 9 is a front perspective view of the retention assembly mounted to the animal trap as shown in FIG. 6, in a preset position and the strike bar in the armed position and the drawer in a second position.

The housing rear wall 306 includes a holding feature 332. The holding feature 332 includes a holding curved surface 342 that is sized and shaped to engage with the retaining arm 206. When the retaining arm 206 is engaged with the holding feature 332 and the strike bar 204 is in the armed position 232, the animal trap 200 and the retention assembly 300 are arranged in a preset position (FIG. 9). In the preset position, the drawer 304 may be arranged in at least one of the second position. In other words, the preset position, allows the drawer 304 to be moved in and out of the housing without disengaging the retaining arm 206. This allows the bait chamber 324 to be filled while maintaining the strike bar 204 in the armed position 232. Further, the retaining arm 206 may be engaged with the holding feature 332 for a plurality of the position of the drawer 304, i.e., the drawer 304 may be arranged in the second position or additionally or alternatively, the drawer 304 may be removed from the housing 302 completely such that bait may be placed within the bait chamber 324. In the embodiments illustrated in FIG. 7-10, the retaining arm 206 may be disengaged with the holding feature 332 when the drawer 304 is in the first position.

While the retaining arm 206 retains the strike bar 204 in the armed position 232, the retaining arm 206 experiences an upward force created by tension stored in the torsion spring 208. This upward force, i.e., up from the base 202, flexes the retaining arm 206 in an upward direction. The flexion of the retaining arm 206 aids the retaining arm 206 to engage with the holding feature 330 or the retaining feature 330. More specifically, the upward force on the retaining arm 206 presses the retaining arm 206 into engagement with the holding curved surface 342 or the retaining curved surface 340.

In the embodiments illustrated in FIG. 7-10, the retaining arm 206 may be engaged with the holding feature 332 when the drawer 304 is in the second position. When the drawer 304 is moved from the second positon to the first position, the retaining arm 206 may become disengaged with the holding feature 332 and engaged with the retaining feature 330. In other words, the animal trap 200 may be transitioned from a preset position to a set position, while the retaining arm 206 retains the strike bar 204 in armed position 232.

Figure 10A:
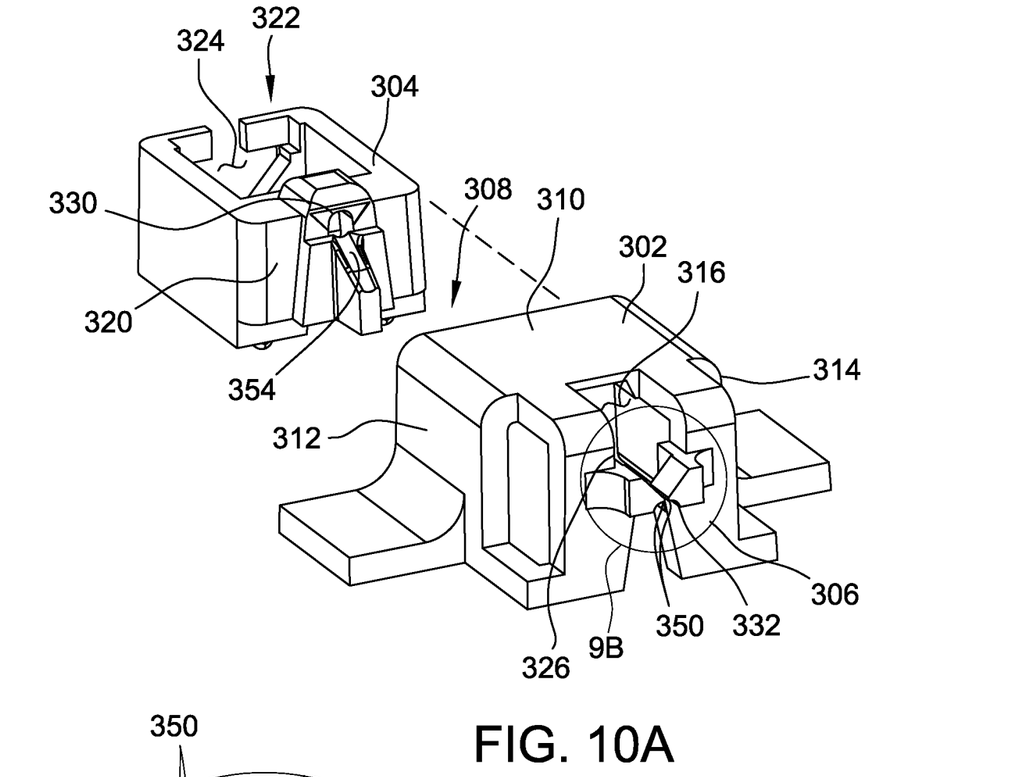
FIG. 10A is an assembly view of the retention assembly shown in FIG. 6, with the drawer removed from the housing.
Figure 10B:
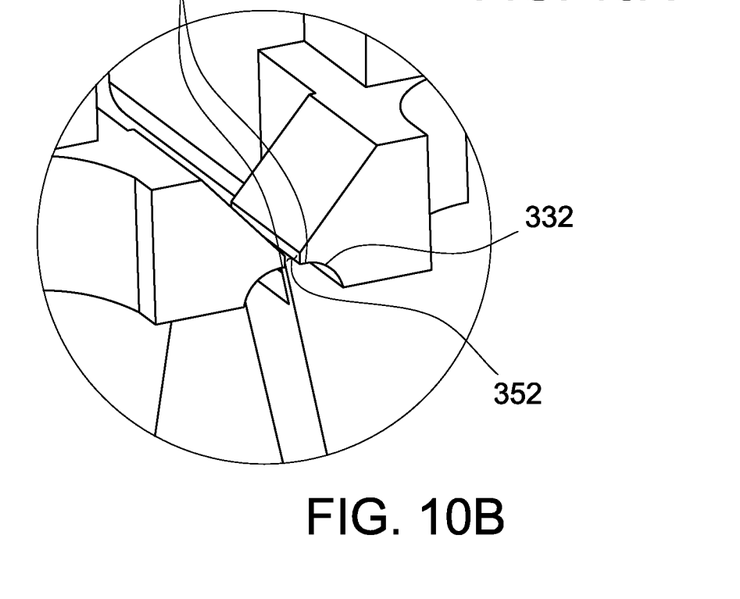
FIG. 10B is a detailed view of the holding feature.

The holding feature 332 includes one or more of a ledge 350. The ledge 350 may define a passageway 352. The retaining feature 330 may include a wedge feature 354 that is aligned with the retaining curved surface 340. The passageway 352 may be aligned with the wedge feature 354. The retaining arm 206 may be engaged with the ledge 350 of the holding feature 332 when the drawer 304 is in the second position. For example, the retaining arm 206 may be moved through the passageway 352 and engaged with the ledge 350 of the holding feature 332 when the drawer 304 is in the first position. When the drawer 304 is positioned from the second position to the first position, wherein the drawer 304 is moved further into the housing chamber 316 and the drawer rear wall 320 moves toward the housing rear wall 306, the retaining arm 206 engaged with the ledge 350 becomes engage with the wedge feature 354. As the drawer 304 is moved further towards the first position from the second position, the retaining arm 206 travels up the wedge feature 354 and through the passageway 352 and become disengaged with the ledge 350 of the holding feature 332 and engaged with the retaining feature 330 of the drawer 304. When the drawer 304 is arranged in the first position, the retaining arm 206 is disengaged with the holding feature 332 and engaged with the retaining feature 330.

As used herein, the terms "about," "substantially," "essentially," and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a," "an," "the," and "said" are intended to mean that there are one or more of the elements. The terms "comprising," "including," "containing," and "having" are intended to be inclusive and mean that there may be additional elements other than the listed elements. The use of terms indicating a particular orientation (e.g., "top," "bottom," "side," etc.) is for convenience of description and does not require any particular orientation of the item described.

As various changes could be made in the above constructions and methods without departing from the scope of the disclosure, it is intended that all matter contained in the

What is claimed is:

1. A retention assembly for an animal trap including a base, the retention assembly comprising:
   a housing configured to be mounted to the base, wherein the housing defines a chamber;
   a drawer at least partially positioned within the chamber such that the drawer is slidable with respect to the housing between a first position and a second position; and
   a retaining feature fixedly coupled to the drawer, wherein the retaining feature is configured to engage a retaining arm of the animal trap in the first position, and wherein the retaining feature is configured to be disengaged from the retaining arm in the second position, wherein slidable movement of the drawer with respect to the base causes disengagement of the retaining arm from the retaining feature.

2. The retention assembly as set forth in claim 1, wherein the drawer includes a bait chamber, wherein the bait chamber is covered by the housing when the drawer is in the first position and wherein the bait chamber is at least partially exposed from the housing when the drawer is in the second position.

3. The retention assembly as set forth in claim 1, wherein the retaining feature is formed integrally on a rear wall of the drawer.

4. The retention assembly as set forth in claim 1, wherein the housing includes a holding feature configured to engage the retaining arm when the drawer is in at least one of the first position or the second position.

5. The retention assembly as set forth in claim 4, wherein the holding feature is formed integrally on a rear wall of the housing.

6. The retention assembly as set forth in claim 4, wherein the holding feature is positioned with respect to the retention feature when the drawer is in the first position.

7. The retention assembly as set forth in claim 4, wherein the holding feature includes a curved surface, a first edge, and a linear surface extending between the curved surface and the first edge.

8. The retention assembly as set forth in claim 4, wherein the holding feature includes a ledge that is aligned with the retention feature.

9. The retention assembly as set forth in claim 1, wherein the retaining feature includes a retaining curved surface.

10. The retention assembly as set forth in claim 4, wherein the drawer includes a wedge feature formed on a rear wall of the drawer, and when the drawer is moved from the first position to the second position, the retaining arm traverses the wedge feature and engages with the retaining feature and disengages with the holding feature.

11. The retention assembly as set forth in claim 10, wherein the holding feature defines a passageway and wherein when the retaining arm travels up the wedge feature, the retaining arm passes through the passageway.

12. An animal trap comprising:
    a base;
    a strike bar;
    a retaining arm configured to hold the strike bar in an armed position;
    a housing mounted to the base, wherein the housing defines a chamber;
    a drawer at least partially positioned within the chamber such that the drawer is slidable with respect to the housing between a first position and a second position; and
    a retaining feature fixedly coupled to the drawer, wherein the retaining feature is configured to engage the retaining arm in the first position to maintain the strike bar in the armed position, and wherein the retaining feature is configured to be disengaged from the retaining arm in the second position to enable the strike bar to move to a released position, wherein slidable movement of the drawer along the base causes disengagement of the retaining arm from the retaining feature.

13. The animal trap as set forth in claim 12, wherein the drawer includes a bait chamber, wherein the bait chamber is covered by the housing when the drawer is in the first position and wherein the bait chamber is at least partially exposed from the housing when the drawer is in the second position.

14. The animal trap as set forth in claim 12, wherein the housing includes a holding feature configured to engage the retaining arm when the drawer is in at least one of the first position or the second position, and wherein when the retaining arm is engaged in the holding feature, the strike bar is in the armed position.

15. The animal trap as set forth in claim 14, wherein the holding feature is positioned with respect to the retaining feature when the drawer is in the first position, such that the retaining arm may be moved from the holding feature to the retaining feature while the retaining arm holds the strike bar in the armed position.

16. The animal trap as set forth in claim 14, wherein the holding feature includes a curved surface, a first edge, and a linear surface extending between the curved surface and the first edge.

17. The animal trap as set forth in claim 16, wherein when the retaining arm is moved between the holding feature to the retaining feature, the retaining arm is moved downward from the holding feature curved surface, along the linear surface, passed under the first edge and then moved upward to the retaining feature.

18. The animal trap as set forth in claim 12, wherein the retaining feature includes a retaining curved surface.

19. The animal trap as set forth in claim 14, wherein the drawer includes a wedge feature formed on a rear wall of the drawer, and when the drawer is moved from the first position to the second position, the retaining arm slides up the wedge feature and engages with the retaining feature and disengages with the holding feature.

20. The animal trap as set forth in claim 19, wherein the holding feature defines a passageway and wherein when the retaining arm travels up the wedge feature, the retaining arm passes through the passageway.

* * * * *